UNITED STATES PATENT OFFICE.

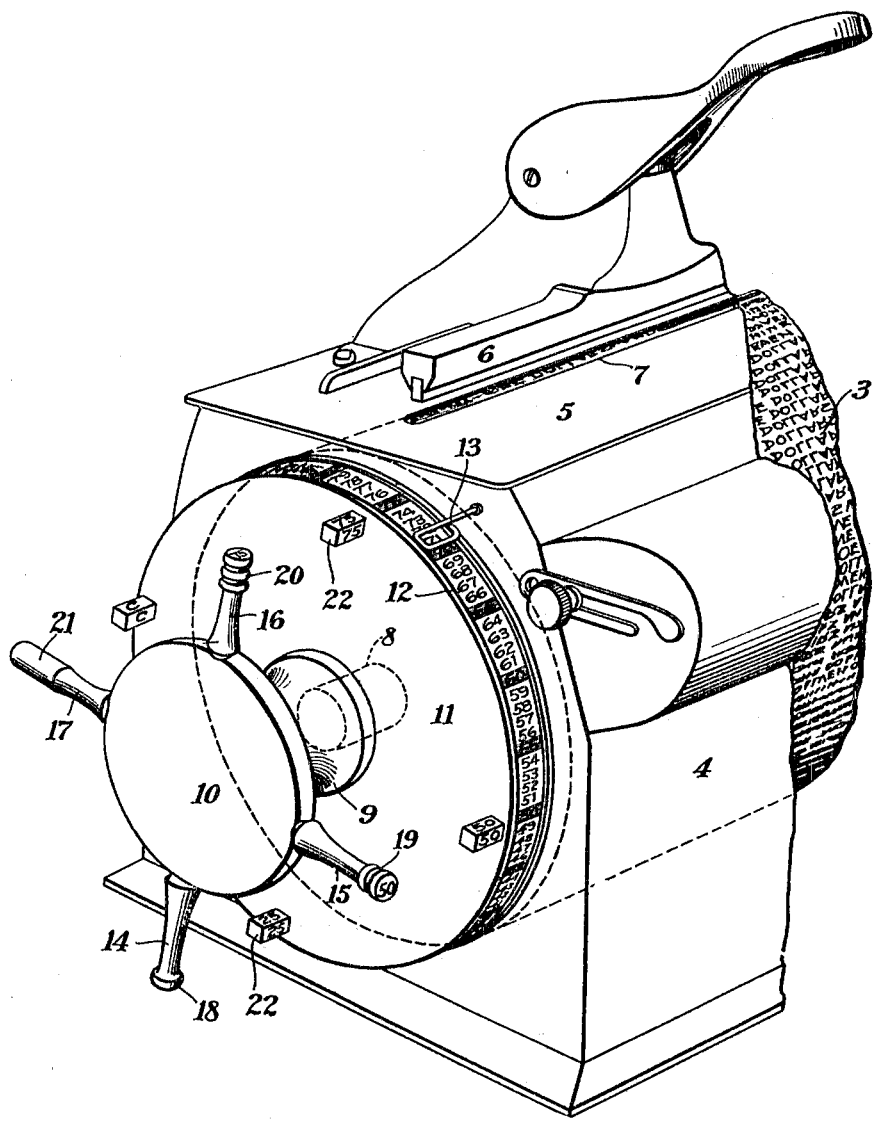

EDMUND OCUMPAUGH, 2d, OF ROCHESTER, NEW YORK.

PRINTING-MACHINE.

1,107,829.  Specification of Letters Patent.  Patented Aug. 18, 1914.

Application filed April 3, 1914. Serial No. 829,314.

*To all whom it may concern:*

Be it known that I, EDMUND OCUM-PAUGH, 2d, a citizen of the United States, and resident of Rochester, in the county of Monroe and State of New York, have invented certain new and useful Improvements in Printing-Machines, of which the following is a specification.

This invention relates to printing-machines, such as check-printing machines and the like, of the type in which a rotatable or otherwise movable type-carrying member is moved manually to bring the various types selectively into operative position.

The object of the invention is to provide a machine of the kind in question with a manually-operable member by which the type-carrier may be quickly and accurately moved to any required position, without strain upon the eyes of the user. To this end I employ a rotatable manually-operable device provided, in the usual manner, with a circular scale of graduations, but in addition to such graduations I employ a series of projections, arranged radially, or otherwise, at one side of the scale and so located as to correspond in position with certain main divisions of the entire number represented by the scale, these projections thus serving to indicate at a glance, or even by the sense of touch, the general position of the scale, so that close inspection of the scale is required only in finding the required subdivisions thereof.

The accompanying drawing is a perspective view of a portion of a check-printing machine embodying the present invention.

The invention is illustrated as embodied in a check-printing machine of a well-known form, this machine having the usual rotatable type-cylinder 3 journaled in a casing 4. The check-blank rests upon a horizontal table 5, and is pressed against the type by a manually-operable platen 6. The table 5 is provided with a slot 7 immediately beneath the platen, and the operative row of type, for each particular setting of the machine, is that which registers with this slot, through which the paper of the blank is pressed against the type.

In order to rotate the type-cylinder to bring the type-rows selectively into operative position, a shaft 8, by which one end of the type-cylinder is journaled, extends through an end of the casing and carries the manually-rotatable device in which the present invention resides. This device, as shown in the drawing, comprises a neck 9 carrying, on its outer end, a disk-like head 10 which can be easily grasped by the hand. At the inner end of the neck is fixed a disk 11 provided, on its periphery, with a scale 12. Where the machine is adapted to print checks of denominations from one to one-hundred the scale is divided into one-hundred parts, as shown. Coöperating with the scale is a looped-shaped member 13, fixed to the casing and providing a sight-opening through which the significant number on the scale is read. To assist in setting the machine certain members, at intervals of five units, are set off from the others by means of a background of different color.

While the scale 12 and the indicator 13 are sufficient in themselves for setting the type-cylinder to any required position, it has been found in practice that the main divisions of the scale are not sufficiently set off to enable the machine to be manipulated as rapidly and easily as is desirable, and accordingly, in the present invention, I employ one or more of a number of analogous devices for indicating at once, and without close observation, the general position occupied at any particular time by the scale. Projecting radially from the head 10 are four arms or spokes 14, 15, 16 and 17, respectively. These spokes not only facilitate the manual rotation of the head by affording convenient hand-holds, but they also are so located as to correspond in position with four main divisions of the scale. In the illustrated scale these divisions occur at the numbers 25, 50, 75 and 100, respectively. In order to enable the user to distinguish between these four divisions each of the spokes is distinctively marked. On the ends of the spokes numbers are placed, these numbers being, respectively, 25, 50, 75, and either 100 or the letter "C". A further device to the same end resides in varying the formation of the spokes, so that they may be readily distinguished from each other by sight, or even by the sense of touch. For this purpose the spoke 14 is shown as provided with a single knob or annular projection 18, while the spokes 15 and 16 have, respectively, two and three such projections, and the spoke 17 is provided with a long cylindrical extremity. In manipulating the spokes the user can distinguish between them by the sense of touch, if the thumb be placed against the side of a spoke so as to feel the shape of its end.

The indicating projections in question, instead of, or in addition to, being mounted upon the head 10, may be mounted upon the disk 11 alongside the scale 12. Thus, as shown in the drawing, I may employ four lateral projections 22, having characteristic numbers placed upon all four of their sides, so that all four of these projections may be distinguished in every position of the mechanism. This last arrangement has the advantage that in examining the projection the eye is not substantially diverted from the scale 12.

I claim:—

1. A setting-device, for printing-machines and the like, comprising a manually-rotatable member provided with an annular graduated scale, and with a series of projections located at one side of the scale and spaced to correspond with main divisions of the scale.

2. A setting-device, for printing-machines and the like, comprising a manually-rotatable member provided with an annular graduated scale, and with a series of projections spaced to correspond with main divisions of the scale, said projections being located at one side of the scale and bearing sensible characteristics by which they may be distinguished from each other and identified with the corresponding scale-numbers.

3. A setting-device, for printing-machines and the like, comprising a manually-rotatable member provided with an annular graduated scale, and with a series of radial projections, at one side of the scale, constituting hand-holds by which the scale may be turned and spaced to correspond to main divisions of the scale.

4. A setting device, for printing-machines and the like, comprising a manually-rotatable member provided with an annular graduated scale, and with a series of radial projections, at one side of the scale, constituting hand-holds by which the scale may be turned and spaced to correspond to main divisions of the scale, said projections bearing sensible characteristics by which they may be distinguished from each other and identified with the corresponding scale-numbers.

5. A setting-device, for printing-machines and the like, comprising a manually-rotatable member provided with an annular graduated scale, and with a series of radial projections, at one side of the scale, spaced to correspond to main divisions of the scale, said projections constituting hand-holds by which the scale may be turned and being differently formed to afford sensible indications of their position with relation to the scale.

6. A setting-device, for printing-machines and the like, comprising a manually-rotatable member provided with an annular graduated scale, a head at one side of the scale, and a series of spokes, projecting radially from the head and spaced to correspond to main divisions of the scale, whereby the spokes serve both to facilitate manipulation of the head, and to indicate approximately the position of the scale.

7. A setting-device, for printing-machines and the like, comprising a manually-rotatable member provided with an annular graduated scale, a head at one side of the scale, and a series of spokes, projecting radially from the head and spaced to correspond to main divisions of the scale, whereby the spokes serve both to facilitate manipulation of the head, and to indicate approximately the position of the scale, each spoke bearing, near its outer end, a distinguishing mark by which it may be identified with the corresponding scale-number.

EDMUND OCUMPAUGH, 2D.

Witnesses:
D. GURNEE,
FARNUM F. DORSEY.